US008112898B2

(12) United States Patent
Allen

(10) Patent No.: US 8,112,898 B2
(45) **Date of Patent: *Feb. 14, 2012**

(54) APPARATUS AND METHODS FOR THE PLACEMENT OF BADGES, RIBBONS AND/OR OTHER ITEMS

(76) Inventor: Matthew Bridger Allen, Houston, TX (US)

( * ) Notice: Subject to any disclaimer, the term of this patent is extended or adjusted under 35 U.S.C. 154(b) by 181 days.

This patent is subject to a terminal disclaimer.

(21) Appl. No.: 12/454,110

(22) Filed: May 11, 2009

(65) Prior Publication Data

US 2009/0307917 A1 Dec. 17, 2009

Related U.S. Application Data

(63) Continuation-in-part of application No. 12/128,179, filed on May 28, 2008, now Pat. No. 7,637,028, which is a continuation-in-part of application No. 11/726,583, filed on Mar. 22, 2007, now Pat. No. 7,559,153.

(60) Provisional application No. 61/051,710, filed on May 9, 2008, provisional application No. 60/786,420, filed on Mar. 27, 2006.

(51) Int. Cl.
*G01D 21/00* (2006.01)
*A44C 3/00* (2006.01)

(52) U.S. Cl. .................. 33/653; 33/563; 33/645; 40/1.5

(58) Field of Classification Search .................... 33/653, 33/562, 563, 566, 11–13, 2 R, 1 G, 679.1, 33/485, 662, 644, 645, 613; 40/1.5, 1.6; 112/136

See application file for complete search history.

(56) References Cited

U.S. PATENT DOCUMENTS

| | | | | | |
|---|---|---|---|---|---|
| 2,821,787 | A | * | 2/1958 | Shepard | 33/653 |
| 3,406,456 | A | * | 10/1968 | Schleich | 33/492 |
| 4,302,884 | A | * | 12/1981 | Pallone | 33/653 |
| 4,326,339 | A | * | 4/1982 | Marino | 33/520 |
| 4,349,966 | A | * | 9/1982 | Marino et al. | 33/489 |
| D291,287 | S | * | 8/1987 | Eisenhauer | D10/64 |
| 6,311,408 | B1 | * | 11/2001 | Madayag | 33/653 |
| 7,325,339 | B2 | * | 2/2008 | Jordan | 40/1.5 |
| 7,559,153 | B2 | * | 7/2009 | Allen | 33/653 |
| 7,587,839 | B1 | * | 9/2009 | Winter | 33/653 |
| 7,637,028 | B2 | * | 12/2009 | Allen | 33/653 |

* cited by examiner

*Primary Examiner* — Amy Cohen Johnson

(74) *Attorney, Agent, or Firm* — Alberto Q. Amatong, Jr.; The Amatong Law Firm, PLLC

(57) ABSTRACT

A template is provided for positioning at least one ribbon assembly on a garment at a predetermined position relative to the pocket. The template has a template body having a generally two-dimensional profile that is removably positionable on the front of the garment at least partially above the pocket. The template also has ribbon assembly positioning guides positioned on the template body to locate a predetermined position of a ribbon assembly on the garment in spaced relation with the pocket and with the template body. The ribbon assembly positioning guide includes a protrusion extending outwardly from the template and configured to support the ribbon assembly at a position at least partly coincidental with the predetermined position of the ribbon assembly. In other words, when the ribbon assembly is supported on the protrusion, the ribbon assembly is at least partly in the predetermined position. For example, the ribbon assembly may be at the proper elevation (i.e., spaced from the pocket).

16 Claims, 7 Drawing Sheets

APPARATUS AND METHODS FOR THE PLACEMENT OF BADGES, RIBBONS AND/OR OTHER ITEMS

This application claims priority to U.S. Provisional Patent Application Ser. No. 61/051,710, filed May 9, 2008; and is a continuation-in-part of U.S. application Ser. No. 12/128,179, filed May 28, 2008, which claims priority to U.S. Provisional Patent Application Ser. No. 61/051,710, filed May 9, 2008, and is a continuation-in-part of and claims priority to U.S. patent application Ser. No. 11/726,583, filed on Mar. 22, 2007, which claims priority to U.S. Provisional Patent Application Ser. No. 60/786,420, filed Mar. 27, 2006, the disclosures of which are all hereby incorporated by reference herein in their entireties and for all purposes.

FIELD OF THE DISCLOSURE

The present disclosure relates generally to methods and apparatus for locating or placing items on carriers. In some embodiments, for example, the items are military badges and/or ribbons and the carriers are service uniforms.

BACKGROUND

It is often desirable to specifically locate or position one or more item on a carrier thereof. Some examples of "carriers" are uniform garments, simulated and artificial garments, f lags, display boards and objects that are ornamental or useful, or a combination thereof. Some examples of "items" are badges, ribbons, medals, awards and/or pins. For example, organizations, such as uniformed and public safety services, typically require that insignia be positioned at specific locations on uniforms worn by its members.

For one particular example, the current regulations of the United States Marine Corps (USMC) for proper positioning of insignia worn on USMC uniforms can be found in the Department of the Navy, MARINE CORPS ORDER P1020.34G MCUB, dated Mar. 31, 2003, particularly, without limitation, Chapter 5, which is incorporated by reference herein in its entirety, and more particularly Pages 5-22, 5-23, 5-35 and 5-40. Presently, all U.S. Marines are required to qualify with the rifle and must wear the appropriate rifle marksmanship badge (expert, sharpshooter or marksman) on designated garments. Under current regulations, each rifle marksmanship badge includes a holding bar having back-facing spikes used to secure the badge to the carrier, such as above the left breast pocket of a uniform blouse or shirt. A series of small metal ringlets connect the holding bar to the main section of the badge. The size of the holding bars and spike location are the same for all three present versions of the rifle marksmanship badges.

A U.S. Marine may also qualify with the pistol. In such instance, present USMC regulations require the Marine to wear both a rifle and a pistol marksmanship badge on particular uniforms. However, when a member has not qualified on the pistol, the only badge that will be worn is the rifle marksmanship badge. In such case, current USMC regulations require the rifle marksmanship badge to be centered over the left breast pocket of the carrier with the bottom edge of the holding bar ⅛th inch above the top edge of the pocket.

Similar to the rifle marksmanship badge, there are presently three levels of pistol qualification: expert, sharpshooter and marksman. Current embodiments of these badges have similar components as the rifle marksmanship badges described above, including a holding bar having back-facing spikes and a series of small metal ringlets connecting the holding bar to the main section of the badge. The holding bars on all three types of pistol marksmanship badges are identical in terms of size and spike placement.

Under present USMC regulations, the pistol marksmanship badges, including holding bars, are smaller than those of the rifle marksmanship badges. When wearing both a rifle and a pistol marksmanship badge, present USMC regulations require the badges be symmetrically placed on a line, centered over the breast pocket, with a ¾ inch space between the adjacent holding bars. The bottom edge of the rifle holding bar must be ⅛th inch above the top edge of the left breast pocket. As the pistol badge holding bar is smaller than the holding bar of the rifle badge, present regulations require the top edge of the pistol holding bar to be in-line with the top edge of the rifle holding bar.

When wearing one or more marksmanship badges, present USMC regulations require that any earned service ribbons are also worn. The service ribbons must be centered over the left breast pocket with the bottom edge of the lowest ribbon(s) positioned ⅛th inch over the top edge of the marksmanship badge(s) holding bar.

However, the present disclosure is not limited to placement of USMC or other military badges and ribbons on service uniforms. Moreover, the present disclosure is not limited by the type, construction or components of garment or other carrier with which the disclosure may be used, or the badge (s), ribbon assembly(ies), medals or other items that may be placed on the carrier. For example, the present disclosure may be used with the placement of other types of badges or ribbons of any military service or other organization on any uniform garment or any other form of carrier (flag, display board, ornament, useful object, simulated garment, etc.), as well as the placement of any other type of items that need to be specifically positioned at any desired location on any carriers thereof.

In positioning and locating one or more items on a carrier, difficulties may be encountered. For example, the item(s) may be difficult or cumbersome to handle and/or precisely position because of the shape, configuration or small size of the item. Precise positioning may also be difficult due to the small or awkward area or nature of the item where the item is to be placed. When more than one item is required to be positioned, the small or differing sizes, shapes and or configurations of the items may be a hindrance to precisely locating and affixing the items. Likewise, if the items are to be positioned proximate to one another, the close desired positioning of the items may make handling and precise positioning difficult. If the precise positioning requires measuring distances or dimensions, making the correct measurements and/or effectively using such measurements may be difficult. For another example, it may be unduly time-consuming to properly precisely position the item(s) on the carrier. In instances where time is in short supply, such as in military-type settings, the importance and burden of correctly placing items on carriers, such as ribbons on uniform shirts, in a short time, could be a source of stress, and the accuracy and correctness of placement may be sacrificed.

In many instances, the items must be removed and/or replaced on repetitive basis, such as to allow for cleaning or maintenance of the carriers, requiring repeated occurrences of precise positioning. Thus, any of the above or other problems associated with precise positioning may be recurring frequently.

It should be understood that the above-described examples, features and/or disadvantages are provided for illustrative purposes only and are not intended to limit the scope or subject matter of the claims of this patent application or any patent or patent application claiming priority hereto. Thus, none of the appended claims or claims of any related application or patent should be limited by the above discussion or construed to address, include or exclude the cited examples, features and/or disadvantages, except and only to the extent as may be expressly stated in a particular claim.

Accordingly, there exists a need for apparatus and methods useful to assist in the accurate positioning of items on carriers.

BRIEF SUMMARY

In one aspect, a template is provided for positioning at least one ribbon assembly on a garment at a predetermined position relative to the pocket. The template has a template body having a generally two-dimensional profile that is removably positionable on the front of the garment at least partially above the pocket. The template also has ribbon assembly positioning guides positioned on the template body to locate a predetermined position of a ribbon assembly on the garment in spaced relation with the pocket and with the template body. The ribbon assembly positioning guide includes a protrusion extending outwardly from the template and configured to support the ribbon assembly at a position at least partly coincidental with the predetermined position of the ribbon assembly. In other words, when the ribbon assembly is supported on the protrusion, the ribbon assembly is at least partly in the predetermined position. For example, the ribbon assembly may be at the proper elevation (i.e., spaced from the pocket).

In some embodiments, the present disclosure involves an apparatus useful for properly positioning at least one badge on the front of a garment at least partially over a pocket of the garment. The badge includes at least first and second engagers extending therefrom for engagement with the garment. The apparatus includes a template removably positionable on the front of the garment at least partially above the pocket. The template includes at least one horizontal alignment indicator useful for centering the template relative to the pocket, a front face, at least one top edge and at least one bottom edge. A bottom edge of the template is alignable along a top edge of the pocket so that when the bottom edge of the template is aligned along the top edge of the pocket, the badge is properly positionable on the garment. At least one raised portion protrudes from the front face of the template, and is capable of seating at least a part of a first badge. When the corresponding first badge portion is seated by the raised portion(s), the first badge is properly positionable relative to the garment. At least one cut-out extends from at least one top edge of the template and terminates between the top edge and at least one bottom edge. First and second engagers of a first badge are moveable and positionable within the at least one cut-out and may be engaged with the garment therethrough. After the badge is properly positioned on the garment, the template is moveable away from the badge without disturbing the position of the at least one badge on the garment.

In various embodiments, the present invention involves a removable template useful for determining correct placement of at least one item at a desired location on the front of a carrier. The template is elongated and includes a single member without moving parts and a front face, top and bottom edges and left and right sides. First and second pairs of opposing measurement reference points are located proximate to the left and right sides of the template, respectively, and are useful for assisting in horizontally positioning the template on the front of the carrier. A first outline on the front face of the template is formed in the shape of at least part of a first item so that the first item may be positioned relative to the first outline for proper alignment of the first item over the template. At least one protruding portion extends from the front face and is associated with the first outline. The at least one protruding portion is capable of seating at least a part of the first item so that when the corresponding part of the first item is seated by at least one the protruding portion, the first item is properly positionable relative to the garment. First and second cut-outs each extend from the top edge of the template and provide large areas wherein first and second rear-facing pins of the first item are concurrently moveable, respectively, regardless of the distance between the pins and positions thereof on the first item. After the item is properly positioned upon and engaged with the carrier, the template may be moved downwardly and away from the tem and removed without disturbing the position thereof.

In many embodiments, the present invention involves a method for properly positioning at least a first item having at least first and second rear-facing engagers on the front of a garment at least partially over a pocket of the garment. This method utilizes an elongated template that includes at least one raised portion protruding from the front face thereof and which is capable of seating at least part of the first item on the template. A bottom edge of the template is aligned along a top edge of the pocket. The first item is placed at least partially onto the template so that a designated part of the first item is seated on the template by the raised portion(s). The first and second rear-facing engagers of the first item are placed through first and second cut-outs formed in the template and engaged with the garment. The template may be slid down and away from the at least first item without disturbing the position thereof.

Accordingly, the present disclosure includes features and advantages which are believed to enable it to advance the art of placing items on carriers. Characteristics and advantages of the present disclosure described above and additional features and benefits will be readily apparent to those skilled in the art upon consideration of the following detailed description and referring to the accompanying drawings.

BRIEF DESCRIPTION OF THE DRAWINGS

The following figures are part of the present specification, included to demonstrate certain aspects of embodiments of the present disclosure and referenced in the detailed description herein.

DETAILED DESCRIPTION

Figure 1:
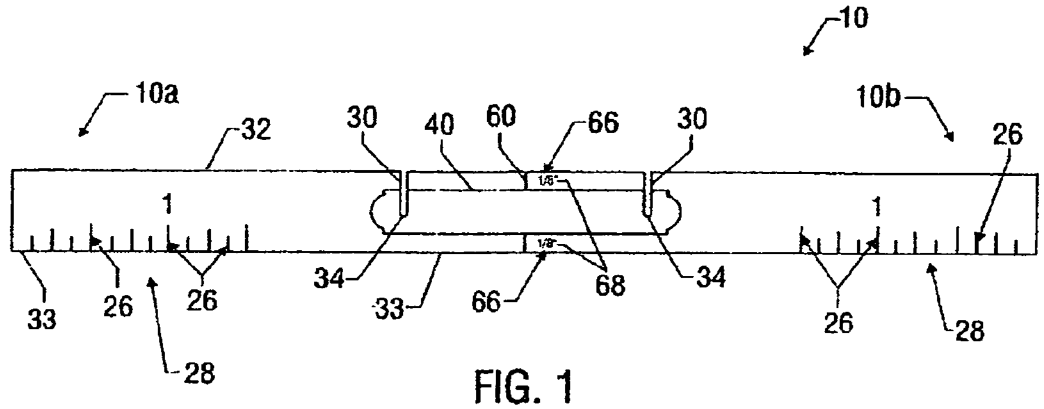
FIG. 1 is a front view showing an apparatus useful for assisting in correctly placing one or more items at a desired location on a carrier in accordance with an embodiment of the present disclosure.

Characteristics and advantages of the present disclosure and additional features and benefits will be readily apparent to those skilled in the art upon consideration of the following detailed description and referring to the accompanying figures. It should be understood that the description herein and appended drawings are of various exemplary embodiments and are not intended to limit the appended claims or the claims of any patent or patent application claiming priority to this application. On the contrary, the intention is to cover all modifications, equivalents and alternatives falling within the spirit and scope of the claims. Many changes may be made to the particular embodiments and details disclosed herein without departing from such spirit and scope.

In the description below and appended figures, common or similar features are indicated by like or identical reference numerals or, in the absence of a reference numeral, are evident based upon the appended figures and/or description herein. The figures are not necessarily to scale and certain features and certain views of the figures may be shown exaggerated in scale or in schematic in the interest of clarity and conciseness. It should also be noted that reference herein and in the appended claims to components and aspects in a singular tense does not necessarily limit the present disclosure to only one such component or aspect, but should be interpreted generally to mean one or more, as may be suitable and desirable in each particular instance.

Referring initially to FIG. 1, an embodiment of a template 10 useful to assist in determining the correct placement of one or more items onto a carrier in accordance with the present disclosure is shown. The term “correct placement” and variations thereof as used herein means the desired placement of the item on the carrier, such as in accordance with pertinent rules and/or regulations. If desired, the template 10 may be constructed for ease of use, ease of storage, longevity or a combination thereof. For example, the template 10 of FIG. 1 is thin and rectangular in outer-shape and constructed of a rigid and durable material, such as plastic. The particular embodiment shown has dimensions of approximately 6% 2" long by approximately ⅝" wide to assist in the placement of a USMC marksmanship badge and, if desired, one or more ribbon assemblies over the breast pocket of a USMC garment, such as a uniform shirt. However, the template 10 may have any desired shape, dimensions, construction and configuration. Further, a template in accordance with the present disclosure is not limited to the placement of USMC marksmanship badges and ribbons, but can be used for placing any item 14 on any carrier Still referring to FIG. 1, the template 10 of this embodiment may include at least one measurement reference point 26, such as to assist in positioning the template 10 over, upon or relative to the carrier 10. If included, the measurement reference point 26 may have any desired form and configuration. For example, the measurement reference point 26 may include any combination of lines, numbers, indentations, protrusions or other marking(s) and, if desired, may be color-coded or otherwise designed to facilitate easy use. In this embodiment, a set 28 of ruler-like reference points 26 is formed in or printed onto the front of the template 10 proximate to each side 10*a*, 10*b* of the template 10 and is useful in centering the template 10 at the desired location over the item 14, such as relative to the breast pocket 22 (see e.g., FIG. 3) of the USMC shirt 24.

Still referring to FIG. 1, the template 10 may include at least one positioner to assist in positioning the item on the carrier. The positioner may have any suitable form and configuration. For example, the positioner may be a cut-out 30 extending downwardly from the top edge 32, upwardly from the bottom edge 33 or from a side edge of the template 10 to a lip 34. Each positioner may be selectively located on the template 10 to assist in allowing correct placement of the item 14 onto the carrier 12. In this embodiment, a pair of aligned slit-like cut-outs 30 with corresponding lips 34 is provided. Each cut-out 30 of this example is capable of allowing the passage therethrough of an engager 36 of an item 14. The engager 36 may have any suitable form, shape and configuration. In this example, the engager 36 is a rear rear-facing spike (see e.g., FIG. 4) of a USMC marksmanship badge 16.

When included, the cut-out 30 may have any suitable form, dimensions and configuration. For example, the cut-out 30 may open at the top edge 32 (e.g., FIG. 1), bottom edge 33 or a side edge of the template 10, or a combination thereof, to allow ease of removal of the template 10 or any other desired purpose. For another example, the cut out 30 may have multiple lips 34 or other features to provide multiple placement positions for the corresponding item 12. If desired, the width of the cut-out 30 may vary along its length. For example, the cutout 30 may have an overall V-shape (not shown). For another example, the cut-out 30 may have a curved shape (not shown). For yet another example, the cut-out 30 may include a circular or other-shaped bulb-like portion (not shown) at the location of the lip 34.

Figure 2:
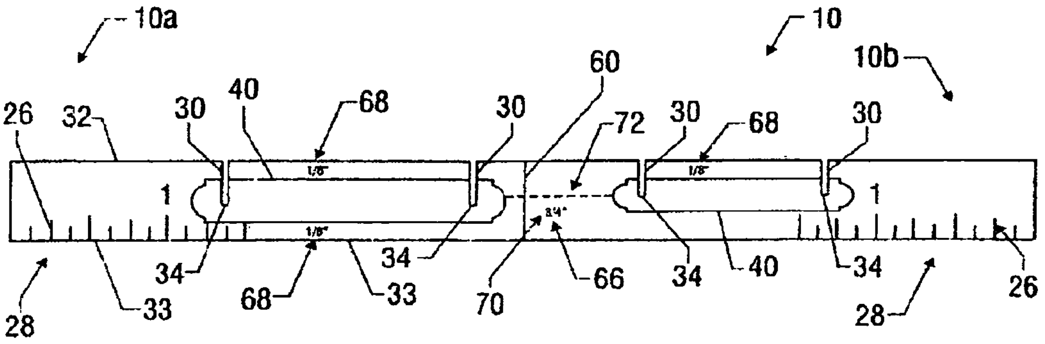
FIG. 2 is a front view showing an apparatus useful for assisting in correctly placing one or more items at a desired location on a carrier in accordance with another, embodiment of the present disclosure.

In some embodiments, the template 10 may include multiple sets of cut-outs 30 to assist in the correct placement of more than one item 14 on a carrier 12. In the embodiment of FIG. 2, for example, the template 10 is configured to assist in the correct placement of two USMC marksmanship badges 16 (see e.g., FIG. 3), such as a USMC rifle marksmanship badge 54 and a USMC pistol marksmanship badge 56, onto a carrier 12. In this example, the pair of cut-outs 30 closest to the left side 10*a* of the template 10 is useful for positioning the rifle badge 54 and the cut-outs 30 closest to the right side 10*b* of the template are useful for positioning the pistol badge 56.

Thus, the present disclosure is not limited by the quantity, shape, configuration, arrangement or dimensions of the cut-out 30, when included.

Still referring to FIG. 1, if desired, at least one outline 40 of an item 14 may be formed in, or provided or printed onto, the template 10 to assist in correct placement of the item or a portion thereof. The outline 4U may have any suitable shape, size, configuration, or location. If desired, the outline 40 maybe color-coded or otherwise designed for ease of use. In the embodiment of FIG. 1, the outline 40 matches the outer shape of the holding bar 48 of a marksmanship badge 50 (see e.g., FIG. 3). The outline 40 of this example is located relative to the cut-outs 30 to assist in ensuring the correct placement of the badge 50 over the template 10 and the engagers 36 in the cut-outs 30. In other embodiments, multiple outlines 40 to match different shaped items or parts thereof, such as different shaped badge holding bars 44 (see e.g., FIG. 3), may be associated with the same cut-out 30 or pair of cut-outs 30, or different cut-outs 30 on the template 10.

In the example of FIG. 2, the template 10 includes outlines 40 associated with each pair of cut-outs 30. The outline 40 associated with the left set of cut-outs 30 matches the current outer shape of the holding bar 48 of a USMC rifle marksmanship badge 54 (see e.g., FIG. 3), while the outline 40 associated with the cut-outs 30 nearest to the right side 10*b* of the template 10 matches the current outer shape of a holding bar 49 of a USMC pistol marksmanship badge 56. Thus, the present disclosure is not limited by the quantity, shape, configuration, arrangement or dimensions of the outline, when included.

Still referring to FIG. 1, if desired, the template 10 may be useful for the correct placement of one or more item 14 on the carrier 12 at a desired location proximate to (e.g., above, below or adjacent to) the template 10 when the template is (temporarily) positioned on the carrier 12. For example, the template 10 may have one or more vertical positioning guides for correct vertical positioning of the item 14 proximate to the template 10. In the embodiment of FIG. 1, the top edge 32 and width of the template 10 may serve as vertical positioning guides for correctly vertically positioning one or more items 14 directly above the location of the template 10. For another example, the template 10 may be provided with one or more horizontal positioning guides for correct horizontal positioning of the item proximate to the template 10. For example, the measurement reference points 26 may serve as a horizontal positioning guide for item(s) 14 to be positioned above or below the location of the template 10. For another example, the template 10 may instead or also include an intermediate reference 60 provided on or in the template 10 to indicate a different location for positioning an item 12 proximate to the template 10. In the embodiment of FIG. 1, the intermediate reference 60 is at the mid-point of the length of the template 10 for centering an item 14 above the template 10.

In the example of FIG. 2, the template 10 may be used for positioning one or more ribbon assemblies 18 on the USMC shirt 24 above the breast pocket 22. As used herein, the term "ribbon assembly" includes one or more military or other similar ribbon and/or corresponding backing member. In this example, the top edge 32 and width of the template 10 serve as vertical positioning guides to provide the proper spacing for placement of the ribbon assembly 18. When the template 10 is properly positioned on the shirt 24 relative to the pocket 22, the placement of the ribbon assembly 18 above and abutting the top edge 32 of the template 10 provides the correct vertical placement of the ribbon assembly 18 on the shirt 24. The intermediate reference 60, provided at the mid-point of the length of the template 10, serves as a horizontal positioning guide to center the ribbon assembly 18 over the template 10 and properly horizontally position the ribbon assembly 18 on the shirt 24. Thus, the present disclosure is not limited by quantity, shape, configuration, arrangement or dimensions of the vertical and/or horizontal positioning guides, when included.

Referring still to FIG. 2, if desired, the template 10 may include one or more indicator 66 to indicate a particular spacing or distance value or other, dimension. The indicator (s) 66 may have any suitable form and configuration. In this embodiment, for example, upper and lower vertical badge spacing indicators 68 are provided on the template 10. These values represent the correct distance between a properly positioned USMC marksmanship badge 16 and adjacent components, or items, that may be located above and/or below the badge 16, respectively. In this particular configuration, the vertical badge spacing indicators 68 each provide a value of ⅛", which represents the distance between the holding bar 44 of a correctly positioned USMC marksmanship badge 16 and (i) any ribbon assemblies 18 (e.g., FIG. 3) that may be correctly positioned above the badge 16, and (ii) the top of the pocket 22, respectively. This particular embodiment also includes a horizontal badge spacing indicator 70, which represents the correct spacing between correctly placed adjacent badge holding bars 44 (e.g., FIG. 3), and a spacer line 72, which illustrates the space represented by the indicator 70. However, the present disclosure is not limited by quantity, shape, configuration, arrangement or dimensions of the indictors, when included.

An embodiment of a method of correctly placing at least one item on a carrier in accordance with the present disclosure will now be described with reference to FIG. 1. It should be understood, however, that the methods of neither the present disclosure nor the appended claims are limited to use with the illustrated template 10 of FIG. 1. In this embodiment, the template 10 is properly positioned at the desired location on the carrier using the measurement reference point(s) 26. For example, if the carrier is a USMC garment, such as a uniform shirt and the item is a USMC rifle marksmanship badge, the exemplary template 10 may be placed flat and face up on the shirt above the breast pocket so that its bottom edge 33 abuts the top edge of the pocket. The corresponding reference points 26 on the left and right sides 10*a*, 10*b* of the template 10 are aligned with the left grip right edges of the pocket, respectively.

After the template 10 is properly positioned relative to the carrier, the item is engaged over the template 10 at the appropriate location to ensure correct vertical and horizontal placement of the item. For example, the holding bar of a two-spike USMC rifle marksmanship badge may be positioned face up over the outline 40 of the template 10. The left and right spikes extending from the rear of the holding bar may be seated against the lips 34 of the left and right cut-outs 30 of the template 10, respectively. The spikes may thereafter be pressed through the carrier, correctly placing the badge on the carrier. If desired, the badge may be secured to the carrier, such as with the use of spike covers. However, the present disclosure may be used for correctly placing items that do not include spikes.

If the template 10 is also useful for assisting in correctly placing of one or more item on the carrier proximate to the template 10 when the template is (temporarily) positioned on the carrier, such item(s) may be correctly positioned on the carrier. For example, if the template 10 includes one or more vertical positioning guide for correct vertical positioning of the item above the template 10 on the carrier, the vertical positioning guide is used to vertically position the item on the carrier. If the template 10 includes one or more horizontal positioning guide for correct horizontal positioning of one or more item above or below the template 10 on the carrier, the horizontal positioning guide is used to horizontally position the item on the carrier. For example, one or more ribbon assemblies may be correctly placed onto the USMC uniform shirt by centering the ribbon assembly on the intermediate reference 60 of the template and abutting the lower edge of the lowermost ribbon assembly with the top edge 32 of the template 10. The ribbon assemblies may thereafter be secured to the carrier, as desired.

If desired, the template 10 may be removed without disturbing the position of the badge and, if included, the ribbon assembly. In this example, the template 10 may be slid downwardly away from the badge and carrier, disengaging the cut-outs 30 from the spikes and removing the template 10.

An embodiment of a method of correctly placing at least one item on a carrier in accordance with the present disclosure will now be described with reference to FIGS. 2-4. It should be understood, however, that the methods of neither the present disclosure nor the appended claims are limited to use with the illustrated template 10 of FIG. 2-4. In accordance with this embodiment, referring to FIG. 3, the subject carrier 12, such as a service uniform shirt 24, may, if desired, be placed on an at least partially flat surface with the desired placement area, such as the breast pocket 22 area, facing up. The template 10 is placed flat and face up on the shirt 24 above the pocket 22 so that its bottom edge 33 is flush with the top edge 23 of the pocket 22. The measurement reference point(s) 26 are used to center the template 10 over the pocket.

Figure 4:
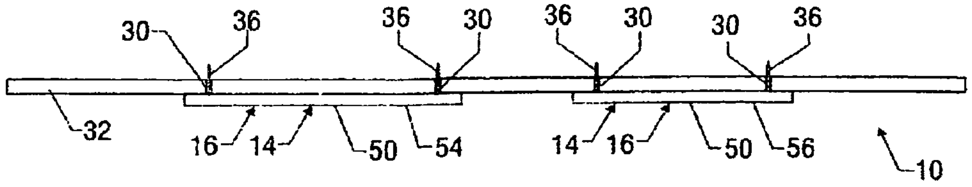
FIG. 4 is an isolated top view of the apparatus shown in FIG. 3 engaged with the USMC rifle and pistol marksmanship badges.

If the template 10 is used to correctly place a USMC rifle marksmanship badge 54 and a USMC pistol marksmanship badge 56 on the shirt 24, the respective engagers 36, such as the spikes extending from the back of the holding bars 44 of the subject badges 54, 56, are positioned at the respective lips 34 of the corresponding cut-outs 30 of the template 10, such as shown in FIG. 4. If one or more outline 40 (FIG. 2) is included on the template 10, the badge holding bars 44 are aligned over the corresponding outlines 40 to ensure proper positioning of the engagers 36. Pressure may be applied to the badges 54, 56, if necessary, to drive the engagers 36 into or through the shirt 24.

Figure 3:
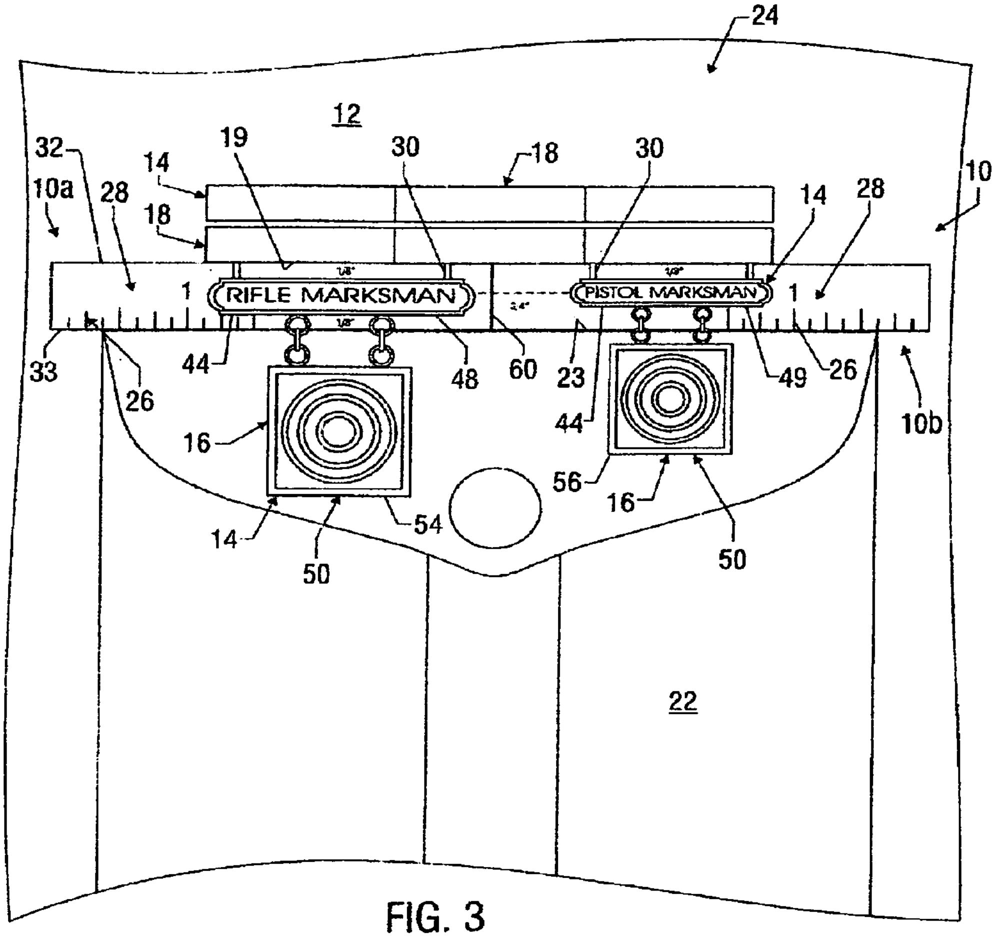
FIG. 3 is a front view of the apparatus of FIG. 2 shown used in the placement of USMC rifle and pistol marksmanship badges and service ribbons on a USMC uniform shirt in accordance with an embodiment of the present disclosure.

Still referring to FIG. 3, it one or more ribbon assemblies 18 are to be positioned, the ribbon assembly 18 is centered over the center reference 60 of the template 10 for correct horizontal alignment. The bottom edge 19 of the ribbon assembly 18 (or lowermost row of multiple vertical ribbon assemblies 18) is aligned flush with and abutting the top edge 32 of the template 10. The ribbon assembly 18 may be engaged with the carrier 12, as is know.

Referring to FIG. 4, the illustrated template 10 may be removed by moving it downward, moving the cut-outs 30 away from the engagers 36 and disengaging the template 10. The badges 54, 56 may be secured to the carrier 12 as is known, such as with spike backings.

Figure 5:
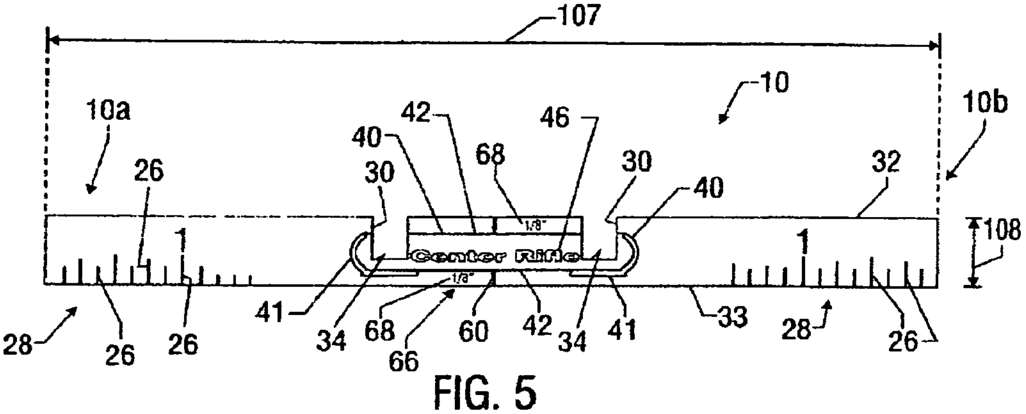
FIG. 5 is a front view showing another embodiment of an apparatus useful for assisting in correctly placing one or more items at a desired location on a carrier in accordance with the present disclosure.
Figure 6:
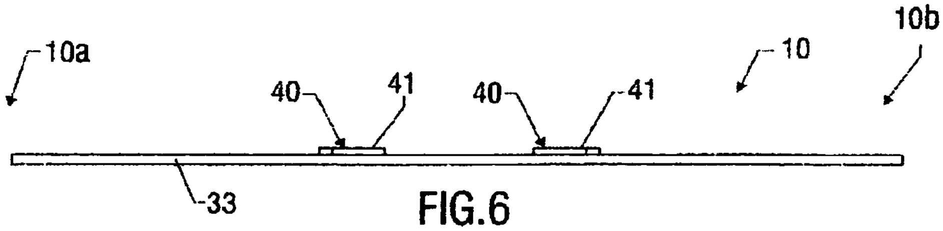
FIG. 6 is a bottom view of the apparatus shown in FIG. 5.
Figure 7:
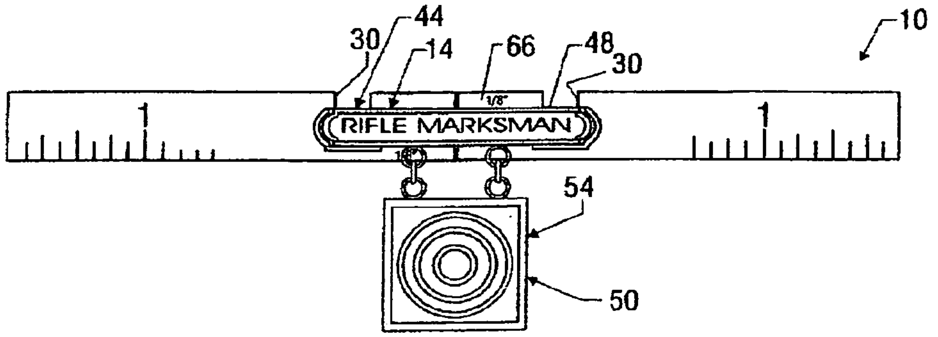
FIG. 7 is a front view of the apparatus shown in FIG. 5 showing an item properly positioned therewith.

Now referring to FIGS. 5 and 6, the outline 40 of this embodiment is at least partially raised, or protruding, from the template 10. In this example, the outline 40 includes two protruding portions 41 located at the left and right lower corners of the outline 40. As shown in FIG. 7, the illustrated protruding portions 41 are positioned and sized to snugly seat an item 14, such as the holding bar 48 of a USMC rifle marksmanship badge 54, therebetween and within the outline 40. However, when included, the raised outline 40 or protruding portion(s) 41 may have any desired shape, form and dimensions and may protrude in any manner and to any desired extent along the entire outline 40 or at desired locations along the outline 40. Further, the outline 40 may be raised or protrude for any desired purpose.

Still referring to FIG. 7, the illustrated protruding portions 41 are sized and located to precisely fit around the left and right bottom corners of an item 14, such as the holding bar 48, seated therebetween, while still allowing the template 10 to be moved away and removed without disturbing the position of the item 14. The protruding portion(s) 41 of this embodiment serve as the primary item positioning feature of the template 10. When the template 10 is properly positioned on an item (not shown), the positioning of the badge holding bar 48 between precise location of the engagers 36 of the badge holding bar 48 within the corresponding cut-outs 30. Accordingly, the engagers 36 of a badge 54 properly positioned with the use of this embodiment may not rest against the respective lips 34 of the cut-outs 30.

Referring again to the example of FIG. 5, in addition or alternately, the outline 40 may include one or more indented portion 42 which may be capable of assisting in seating the item 14. The indented portion(s) 42 of an outline 40 may have any suitable shape, form, dimensions and location. In the embodiment of FIG. 5, the indented portions 42 are provided along all the portions of the outline 40 that do not include a protruding portion 41 or cut-out 30. When an item 14, such as the badge holding bar 48, is positioned between the protruding portions 41, the indented portions 42 may assist in properly seating the bar 48. It should be understood, however, that protruding portions 41 and/or indented portions 42 are not required.

Figure 8:
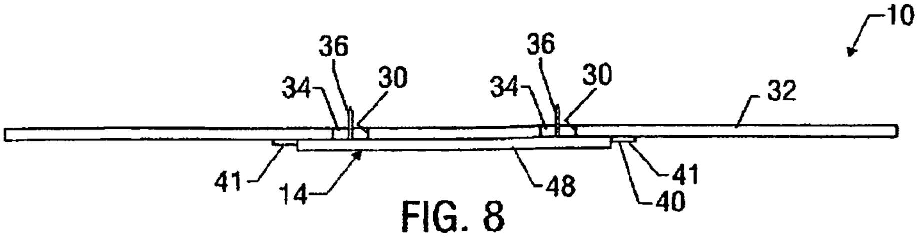
FIG. 8 is a top view of the apparatus shown in FIG. 7.

Still referring to FIG. 5, if desired, the cut-outs 30 may be provided with a large shape, or area, for any desired purpose. In this embodiment, for example, the cut-outs 30 have a square or rectangular shape, providing for a large area within which the engager(s) 36 (e.g., FIG. 8) of the rifle marksmanship badge 54 may be positioned. Each of the cut-outs 30 of this embodiment may, for example, have a width of approximately 7.00 centimeters (measured from left to right) and a height of approximately 9.00 centimeters (measured down from the top edge 32).

The illustrated large cut-outs 30 will allow for the proper positioning of a rifle marksmanship badge 54, regardless of the distance between, precise location and position of the engagers 36 on the respective badge holding bar 48. For example, the template 10 of FIG. 5 may be used for proper positioning of rifle marksmanship badges 54 of any presently known manufacturer, or having any known or expected positioning of its engagers 36.

Referring still to FIG. 5, if desired, one or more marker 46 may be included on the template 10 to assist in proper positioning of an item 14 relative to the template 10. In this example, the marker 46 is the text "Center Rifle" provided on the template 10 within the outline 40. This particular marker 46 serves as a guide for a user to know where to place the holding bar of a rifle marksmanship badge. However, the user of one or more marker 46 is not required.

Figure 9:
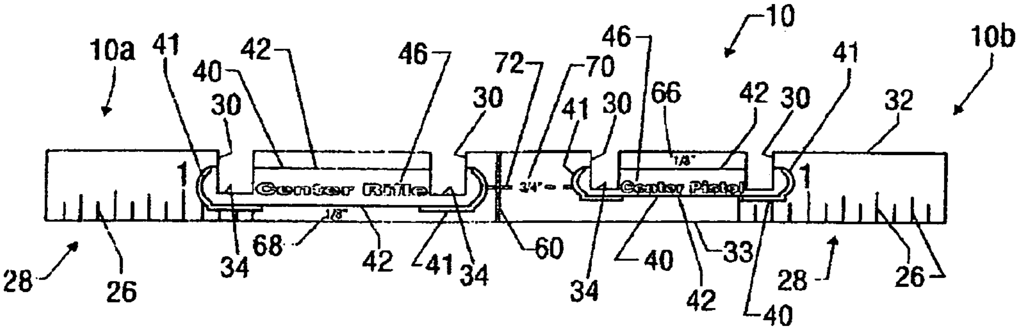
FIG. 9 is a front view showing another embodiment of an apparatus useful for assisting in correctly placing one or more items at a desired location on a carrier in accordance with the present disclosure.
Figure 10:
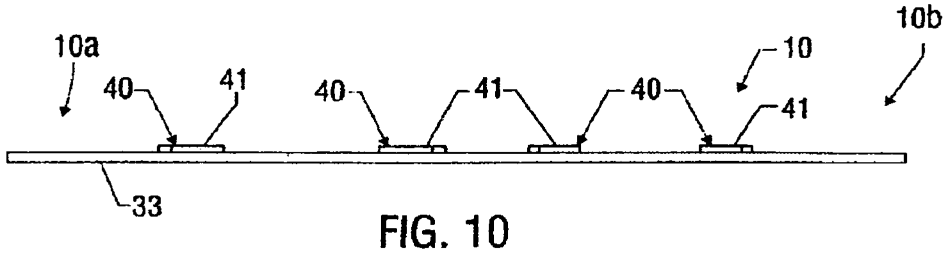
FIG. 10 is a bottom view of the apparatus shown in FIG. 9.
Figure 11:
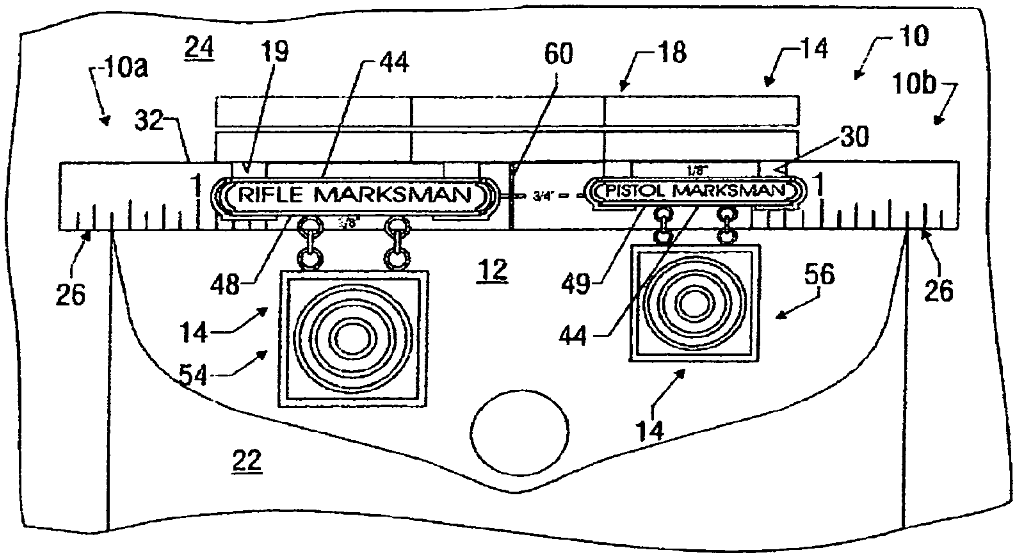
FIG. 11 is a front view the apparatus of FIG. 9 shown used in the placement of USMC rifle and pistol marksmanship badges and service ribbons on a USMC uniform shirt in accordance with an embodiment of the present disclosure.

Now referring to FIGS. 9-11, an embodiment of a template 10 is shown having two outlines 40 with corresponding protruding portions 41 and indented portions 42 similarly as described above. The outline 40 closest to the left side 10*a* of the template 10 is useful for positioning a USMC rifle marksmanship badge 54 (e.g., FIG. 11) and includes a marker 46 with the text "Center Rifle". The outline 40 closest to the right side 10*b* of the template 10 is useful for positioning a USMC pistol marksmanship badge 56 (e.g., FIG. 11) and includes a marker 46 having the text "Center Pistol". This embodiment also includes a second set of cut-outs 30 associated with the outline 40 near the right side 10*b* of the template 10. In this example, each of the second set cut-outs 30 may, if desired, have a width of approximately 5.00 centimeters and a height of approximately 7.00 centimeters.

Figure 12:
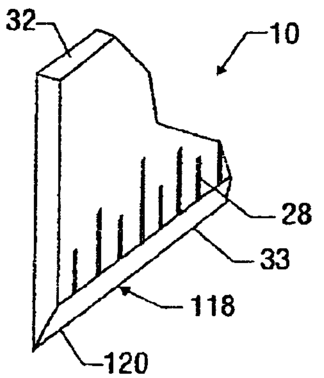
FIG. 12 is a partial perspective view of an apparatus useful for assisting in correctly placing one or more items at a desired location on a carrier and having a gripper in accordance with an embodiment of the present disclosure.
Figure 14:
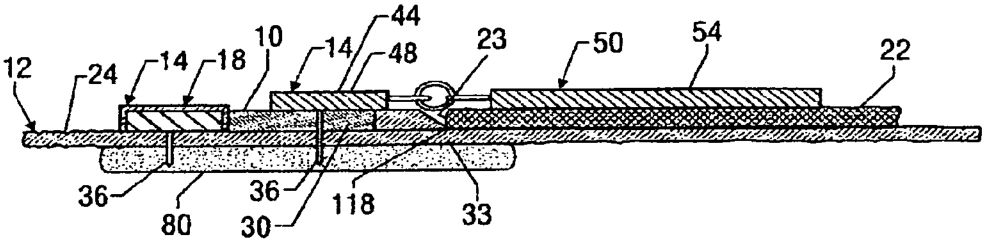
FIG. 14 is partial cross sectional view of an embodiment of an apparatus shown as used for assisting in correctly placing multiple items at desired locations on a carrier in accordance with the present disclosure.

In another independent aspect of the present disclosure, referring to FIG. 12, the bottom edge of the template 10 may include one or more gripper 118 to assist in the snug, accurate and/or secure positioning of the template 10 relative to the carrier 12 (e.g., FIG. 14). The gripper(s) 118, in included, may have any suitable form, configuration, dimensions and construction. In the embodiment of FIG. 12, for example, the gripper 118 is the bottom edge 33 of the template 10 having a wedged or pointed cross-sectional shape across its entire length (e.g., length 107, FIG. 5). A thin tip 120 is thus formed along the edge 33. When the template 10 of FIG. 12 is positioned over a pocket 22 (e.g., FIG. 14), for example, the tip 120 can firmly dig into, or grip, the top seam of the pocket 22. In other embodiments, the gripper 118 may not extend across the entire length of the template 10. For example, the gripper 118 may extend along only one or more portions of the bottom edge 33 of the template 10, include one or more spiked-portions (not shown) or have other portions extending from the template 10. Thus, the present disclosure is not limited by the particular form of the gripper(s) 118. Moreover, the gripper 118 is not required in all embodiments of the present disclosure.

The extent to which the gripper 118 actually engages the carrier 12 may vary for any suitable reason, such as, for example, the desire to easily remove the template 10 from the carrier 12 after placement of the items 14 thereupon. Also, if necessary or desired, the height of the template 10 (e.g., height 108, FIG. 5) may be increased or otherwise adjusted to accommodate for any portion of the gripper 118, such as the tip 120, that will extend into the carrier 12 during use or that otherwise alters the true height of the template 10.

Figure 13:
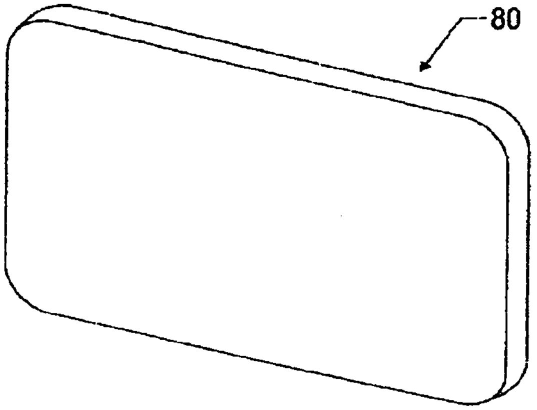
FIG. 13 is a perspective view of an embodiment of a back support in accordance with the present disclosure.

Now referring to FIGS. 13-14, in yet another independent aspect of the present disclosure, one or more back support 80 may be included for any desired reason. For example, the back support 80 may be included to assist in accurate positioning of the item(s) 14 on the carrier 12. For another example, the back support 80 may be included to support the items 14 when engaged on the carrier 12. The back support 80 may have any suitable form, configuration, construction, dimensions and other attributes. For example, the back support 80 may be a piece of cardboard, foam or other material having dimensions equal or greater that the total height and width of the area of the carrier 12 that will bear the items 14. The back support 80 of FIG. 12 has a generally rectangular shape and is constructed of foam. If desired, the back support 80 may be adjustable in size. For example, the back support 80 of FIG. 12 may be cut to more precisely match the area of the carrier 12 that will carry the items 14. However, a back support 80 is not required.

An embodiment of a method of correctly placing at least one item 14 on a carrier 12 in accordance with the present disclosure will now be described with reference to FIGS. 9, 11 and 14. It should be understood, however, that the methods of neither the present disclosure nor the appended claims are limited to use with the illustrated template 10 of FIG. 9, 11 or 14. Referring to the embodiment of FIG. 14, the subject carrier 12, such as a USMC uniform shirt 24, may be placed on an at least partially flat surface with the desired placement area, such as the breast pocket 22 area, facing up. If one or more back support 80 is used, the back support 80 is placed underneath the carrier 12 under the area that will carry the item(s) 14.

The template 10 is properly positioned at the desired location on the carrier 12. For example, if the carrier is a uniform shirt 24, the exemplary template 10 may be placed flat and face up on the shirt above the left breast pocket 22 so that its bottom edge 33 is flush with or abuts the top edge 23 of the pocket 22. If the template 10 includes one or more gripper 118, the gripper 118 is engaged with the carrier 12. For example, if the gripper 118 extends from the bottom edge 33 of the template 10, the gripper 118 is engaged with the top of the pocket 22. The corresponding measurement reference points 26 (e.g., FIG. 9) on the left and right sides 10*a*, 10*b* of the template 10 are aligned with the left and right edges of the pocket 22, respectively, to center the template 10 over the pocket 22.

Still referring to the example of FIG. 14, after the template 10 is properly positioned relative to the carrier 12, each item 14 to be placed onto the carrier 12 is engaged over the template 10 at the appropriate location to ensure correct vertical and horizontal placement of the item 14. If the exemplary template 10 is used to correctly place a USMC rifle marksmanship badge 54 and a USMC pistol marksmanship badge 56 on the shirt 24, for example, the respective badge holding bars 44 are each placed face up over the appropriate marker 46 (e.g., FIG. 9) and within or over the corresponding outline 40. If the outlines 40 include one or more protruding portions 41 and/or indented portions 42, such as in FIGS. 9 and 11, each item 14, such as the holding bar 44, is placed within or between the corresponding protruding portions 40 and/or within the indented portion(s) 42. The engagers 36, such as mounting pins or spikes, extending from the back of the holding bars 44 of the item 14 are thus positioned within the corresponding cut-outs 30 of the template 10. The items 14 may be fully engaged with the carrier 12, such as by applying pressure to the front of the badge holding bars 48, 49 to drive the engagers 36 through the shirt 24 and back support(s) 80 (if included), or otherwise as desired.

If the template 10 is also useful for assisting in correctly placing of one or more item 14 on the carrier 12 proximate to the template 10, such item(s) may be correctly positioned. If the template 10 includes one or more vertical and/or horizontal positioning guide for positioning of the item 14 above the template 10 on the carrier 12, such guide(s) may be used to position the item 14 on the carrier 12. For example, as shown in FIG. 11, if one or more ribbon assemblies 18 are to be positioned, the ribbon assembly 18 may be centered over the intermediate reference 60 of the template 10 for correct horizontal alignment. For proper vertical alignment, the bottom edge 19 of the ribbon assembly 18, or lowermost row of multiple vertical ribbon assemblies 18 may be aligned flush with and abutting the top edge 32 of the template 10. The ribbon assembly 18 may be engaged with the carrier 12 and back support 80 (if included), as desired.

The illustrated template 10 may be removed without disturbing the position of the items 14, such as by sliding the template 10 generally downwardly away from the item(s) 14. As desired, the items 14 may be further secured to the carrier 12 and back support 80, if included. For example, backings, clasps, fasteners, spike covers or other connectors may be engaged with the end of the engagers 36 extending on the inside of the carrier 12 or back support 80.

Examples of the present disclosure thus offer advantages over the prior art. However, each of the appended claims does not require each of the components and acts described above and is in no way limited to the above-described examples and methods of assembly and operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

Figure 15:
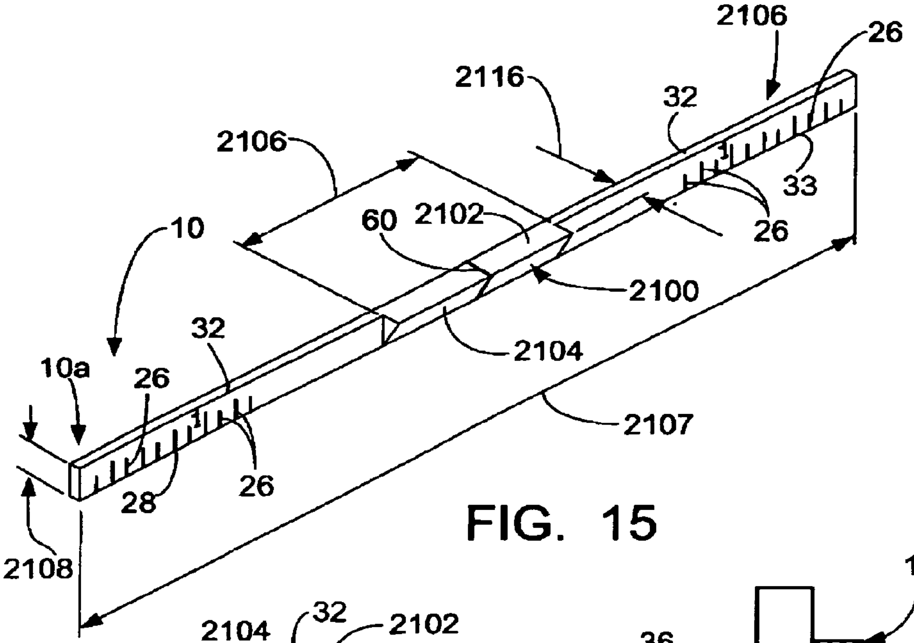
FIG. 15 is a simplified illustration of a template, according to the present invention.

Now referring to the embodiment of FIG. 15, in another aspect of the present disclosure, the template 10 may include a ribbon rest 2100 useful for any suitable purpose. For example, the ribbon rest 100 may protrude from the template 10 to serve as a sort of "shelf" upon which the bottom of one or more ribbons may be placed for positioning on and engagement with the carrier 12.

The ribbon rest 2100 may have any suitable form, configuration and construction. In the embodiment shown, the ribbon rest 2100 is a triangular-shaped protrusion 2104 extending outwardly from the center front of the template 10. The exemplary protrusion 2104 has a flat top surface 2102 designed to accommodate a ribbon assembly 18 (e.g., FIGS. 16, 17) as the assembly preferably extends out at a approximately ninety degree angle from the top edge 32 of the template 10.

The illustrated ribbon rest 2100 is located at the center of the template 10 longwise. Accordingly, the centering of a ribbon assembly 18 above or on the ribbon rest 2100 will center the ribbon assembly 18 relative to the template 10. If the template 10 is centered relative to the pocket 22 (e.g., FIGS. 16, 17) of a carrier 12, the ribbon assembly 18 will be centered relative to the pocket 22. If desired, the ribbon rest 2100 may include one or more position indicators, such as an intermediate reference 60 as described above.

The ribbon rest 2100 may be constructed of any suitable material, such as the same material as the template 10. In some embodiments, the ribbon rest 2100 may include one or more separate components connected together and/or connected to the template 10, such as with glue, epoxy or mechanical fasteners, by snap locking or sliding engagement or any other suitable arrangement, as is or become known. In other embodiments, the ribbon rest 2100 may be integrally formed during molding or manufacturing as part of the template 10. Thus, the present disclosure is not limited by the construction of the ribbon rest 2100.

The ribbon rest 2100 may likewise have any suitable dimensions. For example, the ribbon rest 2100 may extend across the entire or only part of the length of the template 10. In the embodiment of FIG. 15, the ribbon rest 2100 has a length 2106 that is the same as the length of a standard military ribbon, such as a U.S. Navy ribbon.

Likewise, the ribbon rest 2100 may protrude from the template 10 any desired distance. In the example of FIG. 15, the ribbon rest 2100 protrudes from the template 10 so that the top surface 2102 has a width 2116 of approximate ½ inch to accommodate the combined width (and positioning) of a standard military (e.g., U.S. Navy) ribbon, ribbon rack and its engagers, such as spikes. However, the top surface 2102 may have any desirable width 2116. The template 10 upon which the ribbon rest 2100 is used may also have any suitable dimensions. In the embodiment of FIG. 15, for example, the template 10 has a length 2107 of 6½ inches and a height 2108 of ¼ inch, so that when the bottom edge 33 of the template 10 is placed abutting the top edge of the breast pocket 22 of a U.S. Navy shirt 110, a ribbon assembly 18 positioned on the shirt 110 above the ribbon rest 2100 as described above will be 14 inch above the pocket 22. (Currently, U.S. Navy regulations require positioning of the bottom row of ribbons to be centered ¼ inch above the left breast pocket of a uniform shirt).

Figure 16:
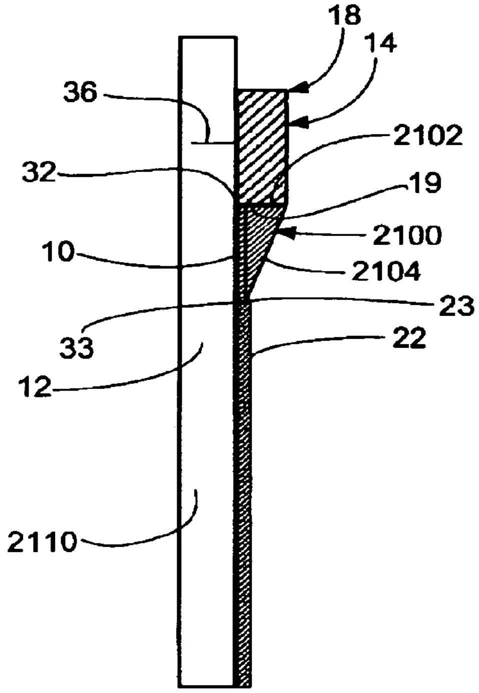
FIG. 16 is a side view of the template in FIG. 15, according to the present invention.
Figure 17:
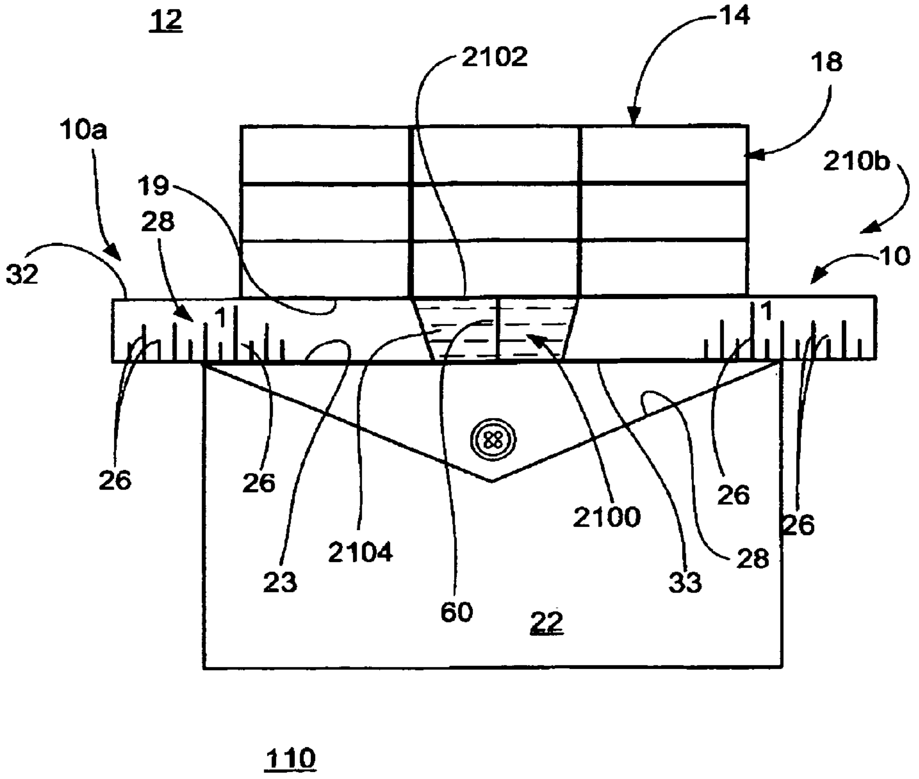
FIG. 17 is a front view of the template as applied in FIG. 16.

In an exemplary embodiment of a method of correctly placing at least one item 14 on a carrier 12 with the use of the embodiment of FIGS. 15-17, the carrier 12, such as the shirt 110, is ideally first placed on a flat surface with the subject area (e.g., the breast pocket 22 of shirt 110) facing up. If one or more back support (not shown) is used, it is placed below the carrier 12. The template 10 is aligned with the top edge 23 of the breast pocket 22, such as described above. The measurement reference points 26 are used to center the template 10 over the top edge 23 of the pocket 22. The ribbon assembly 18 is centered on the intermediate reference 60, if included, or otherwise on the ribbon rest 2100. The bottom edge 19 of the ribbon assembly 18 is made flush (e.g., generally normal to) with the top surface 2114 of the ribbon rest 2100. The ribbon assembly 18 may then be pushed toward the carrier 12, engaging the engagers 36 of the ribbon assembly 18 with the carrier 12. If desired, clasps or other connected may be engaged over the back support to secure the ribbon assembly to the carrier 12 and back support. The template 10 may be easily removed without disturbing the positioning of the ribbon assembly 18 on the carrier 12.

Figure 19:
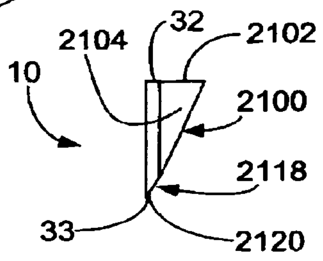
FIG. 19 is a side view illustration of the bottom edge and a gripper in FIG. 17.
Figure 18:
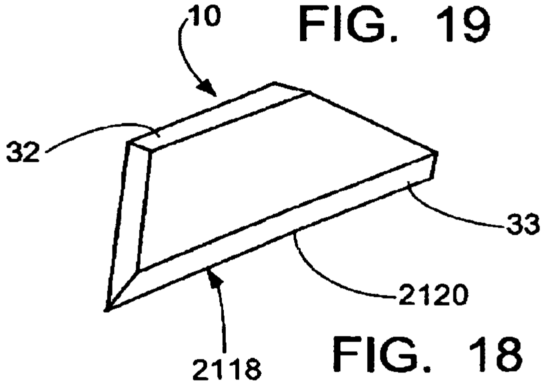
FIG. 18 is a partial view of a bottom edge of the template in FIG. 17.

In another aspect of the present disclosure, referring to FIG. 18, the bottom edge of the template 10 may include one or more gripper 2118 to assist in the snug, accurate and/or secure positioning of the template relative to the carrier 12. The gripper(s) 2118 may have any suitable form, configuration, dimensions and construction. In the embodiments of FIGS. 18 and 19, for example, the gripper 2118 is the bottom edge 3.3 of the template 10, which is wedged or pointed across its entire length to form a thin tip 2120 at the end of the edge 33. When the template 10 of FIG. 18 or 19 is positioned over a pocket 22 (e.g., FIG. 16), for example, the tip 2120 can firmly dig into, or grip, the top seam of the pocket 22. In other embodiments, the gripper 2118 may not extend across the entire length of the template 10, such as along one or more portions of the bottom edge 33, or may instead include one or more spikes (not shown) or other portions extending from the bottom edge 33. Thus, the present disclosure is not limited by the particular form of the gripper(s) 2118.

The extent to which the gripper 2118 actually engages the carrier 12 may vary based upon the desire to easily remove the template 10 from the carrier 12 after placement of the items 14 thereupon. Also, if necessary or desired, the height of the template 10 (e.g., height 2108, FIG. 15) may be increased or otherwise adjusted to accommodate for any portion of the gripper 2118, such as the tip 2120, that will extend into the carrier 12 during use or that otherwise alters the true height of the template 10.

Examples of the present disclosure thus offer advantages over the prior, art. However, each of the appended claims does not require each of the components and acts described above and is in no way limited to the above-described examples and methods of assembly and operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

The methods described above and which may be claimed herein and any other methods which may fall within the scope of the appended claims can be performed in any desired suitable order and are not necessarily limited to the sequence described herein or as may be listed in any appended claims. Further, the methods of the present disclosure do not necessarily require use of the particular examples shown and described in the present specification, but are equally applicable with any other suitable structure, form and configuration of components.

While preferred embodiments have been shown and described, many variations, modifications and/or changes of the system, apparatus and methods herein, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of this disclosure and scope of the appended claims. Thus, all matter herein set forth or shown in the accompanying drawings should be interpreted as illustrative, and the scope of this disclosure and the appended claims should not be limited to the examples described and shown herein.

The invention claimed is:

1. A template for placing one or more items on a carrier, the template comprising:

a template body with top, bottom and opposing side edges, a front surface defined within said side edges, and a vertical centerline bisecting the front surface between the side edges, wherein a length of the template body is defined as a distance across the front surface from one side edge to the opposing side edge;

a plurality of measurement reference points for positioning the template at a predetermined position relative to the carrier, the measurement reference points being located on the template body on the front surface; and at least one protrusion extending outwardly from, and generally normal to, the template body along the top edge of the template to form a support surface generally normal to the front surface, whereby after the template is positioned at the predetermined position relative to the carrier, at least one item may be positioned atop said at least one protrusion and engaged with the carrier and the template and removed without disturbing the position of the item relative to the carrier;

wherein the protrusion and the support surface are generally centered about the vertical centerline of the template body and extend lengthwise in parallel relation with the length of the template body but spaced inwardly from each side edge; and wherein the measurement reference points include a first set of reference points located proximate a first of the side edges and a second set of reference points, separated from the first set, located proximate a second of the side edges, the first and second sets of reference points and the protrusion being mutually aligned such that the protrusion is generally centrally positioned on the front surface between the first set and the second set.

2. The template of claim 1, wherein the support surface is co-planar with the top edge and oriented approximately ninety degrees to the front surface.

3. The template of claim 1, wherein the protrusion extends outwardly from the front surface from the top edge to the bottom edge such that the protrusion covers the height of the front surface, with a set of reference point positioned on either side of the protrusion.

4. A template for positioning at least one ribbon assembly on a garment at a predetermined position relative to a pocket on the garment, said template comprising:

a template body having a generally two-dimensional profile and including a generally flat front surface, the template body being removably positionable on a front of a garment at least partially above a pocket, wherein the template body further includes top, bottom and opposing side edges, a front surface defined within said side edges, and a vertical centerline bisecting the front surface between the side edges and wherein a length of the template body is defined as a distance across the front surface from one side edge to the opposing side edge; and a ribbon assembly positioning guide positioned on the template body to locate a predetermined position of a ribbon assembly on the garment in spaced relation with the pocket and with the template body, the ribbon assembly positioning guide including a protrusion extending outwardly from, and generally normal to, the front surface of the template body to form a generally, planar support surface configured to support the ribbon assembly at a position at least partly coincidental with the predetermined position of the ribbon assembly; and wherein the protrusion and the support surface are generally centered about the vertical centerline of the template body and extend lengthwise in parallel relation with the length of the template body but spaced inwardly from each side edge; and further comprising template position indicators for positioning the template at a predetermined template position relative to the pocket, whereby the protrusion indicates, at least partly, a predetermined position of the ribbon assembly relative to the pocket as the template is positioned at the template predetermined position and wherein the template position indicators include measurement reference points having a first set of reference points located proximate a first of the side edges and a second set of reference points, separated from the first set, located proximate a second of the side edges, the first and second sets of reference points and the protrusion being mutually aligned such that the protrusion is generally centrally positioned on the front surface between the first set and the second set.

5. The template of claim 4, wherein the template body is configured such that when the position indicators are aligned with the pocket to place the template body in the predetermined template position, the ribbon assembly positioning guides are simultaneously positioned to fix a predetermined position of the ribbon assembly relative to the pocket and the template body, the template position indicators including horizontal alignment indicators positioned on the template body to center said template body relative to the pocket and the bottom edge of the template body, the bottom edge being alignable along a top edge of the pocket.

6. The template of claim 5, wherein the ribbon assembly positioning guide includes a centering reference indicator on the protrusion.

7. The template of claim 6, wherein the protrusion is vertically positioned to coincide with a predetermined vertical position of the ribbon assembly relative to the template body and relative to the pocket when the template body is at the template predetermined position.

8. The template of claim 5, wherein said ribbon assembly positioning guide include the top edge of said template body and a center positioning reference mark on the template body, the template body being configured such that, at the predetermined position relative to the pocket, the ribbon assembly positioning guides fix the predetermined position of the ribbon assembly relative to the pocket, the predetermined position of the ribbon assembly being spaced from the pocket.

9. The template of claim 8, wherein the center positioning reference mark includes a line that extends from the top edge and across the support surface.

10. The template of claim 9, wherein the center positioning reference mark extends linearly from across the center of the top edge, across the support surface and below the support surface across a front of the protrusion.

11. The template of claim 4, wherein the support surface extends at approximately a ninety degree angle from the front surface and has a width greater than a top width of the template.

12. The template of claim 11, wherein the planar support surface has a length that is less than one-half the length of the template body.

13. The template of claim 4, further comprising a gripper formed by a bottom edge of the template adapted to engaged a top seam of the pocket.

14. The template of claim 13, wherein the bottom edge is wedge-shaped to provide the gripper.

15. The template of claim 4, wherein the support surface extends from and is co-planar with said top edge and oriented approximately ninety degrees to the front surface.

16. The template of claim 4, wherein the protrusion extends outwardly from the front surface from the top edge to the bottom edge, with a set of reference point positioned on either side of the protrusion.

* * * * *